(12) United States Patent
Baek et al.

(10) Patent No.: US 10,696,548 B2
(45) Date of Patent: Jun. 30, 2020

(54) METHOD OF PREPARING A SINGLE-PHASE OXIDE FOR HYDROGEN STORAGE HAVING A $TIO_2$ CRYSTAL PHASE

(71) Applicant: KOREA RESEARCH INSTITUTE OF STANDARDS AND SCIENCE, Daejeon (KR)

(72) Inventors: Seung Wook Baek, Daejeon (KR); Jung Hyun Kim, Sejong-si (KR); Chang Ho Ahn, Daejeon (KR); Mee Kyung Kim, Daejeon (KR); Gyo Ri Park, Daejeon (KR); Sun Woong Song, Daejeon (KR); Ki Chae Jung, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 37 days.

(21) Appl. No.: 16/157,576

(22) Filed: Oct. 11, 2018

(65) Prior Publication Data
US 2019/0300363 A1    Oct. 3, 2019

(30) Foreign Application Priority Data

Mar. 27, 2018  (KR) .................. 10-2018-0035308

(51) Int. Cl.
*C01B 3/00* (2006.01)
*C01G 31/00* (2006.01)

(52) U.S. Cl.
CPC ............ *C01B 3/001* (2013.01); *C01G 31/006* (2013.01); *C01P 2002/54* (2013.01); *C01P 2002/72* (2013.01); *C01P 2006/40* (2013.01)

(58) Field of Classification Search
CPC ...... C01B 3/001; C01G 31/006; C01G 31/00; C01P 2006/40; C01P 2002/72; C01P 2002/54
See application file for complete search history.

(56) References Cited

U.S. PATENT DOCUMENTS

2007/0129241 A1* 6/2007 Schermanz ........ B01D 53/9418
                                                             502/240
2017/0121229 A1* 5/2017 Hirose .................. C01G 31/00

FOREIGN PATENT DOCUMENTS

KR     10-2014-0141943 A    12/2014

\* cited by examiner

*Primary Examiner* — Andrew J. Oyer
(74) *Attorney, Agent, or Firm* — Rabin & Berdo, P.C.

(57) ABSTRACT

Disclosed is a method of preparing an oxide for hydrogen storage, including (a) mixing and calcining vanadium oxide and titanium oxide to provide an oxide, (b) impregnating the oxide obtained in step (a) with a noble metal precursor aqueous solution, and (c) subjecting the oxide obtained in step (b) to heat treatment in a reducing atmosphere, wherein the oxide obtained in step (a) has the composition of Chemical Formula (1) below and is composed of a single-phase $TiO_2$ crystal phase:

$$V_{1-x}Ti_xO_2, \quad \text{Chemical Formula (1)}$$

where $0.05 \leq x \leq 0.95$.

10 Claims, 3 Drawing Sheets

METHOD OF PREPARING A SINGLE-PHASE OXIDE FOR HYDROGEN STORAGE HAVING A TIO₂ CRYSTAL PHASE

SPECIFIC REFERENCE TO A GRACE PERIOD INVENTOR DISCLOSURE

This invention has been published in the 2017 Fall Meeting of the Korean Ceramic Society held by the Korean Ceramic Society on Oct. 11, 2018-Oct. 13, 2018.

BACKGROUND OF THE INVENTION

1. Field of the Invention

The present invention relates to an oxide for hydrogen storage having a single-phase $TiO_2$ crystal phase and a method of preparing the same, and more particularly to a method of preparing an oxide for hydrogen storage, which makes up for an existing solid-phase synthesis process in order to prepare an oxide for hydrogen storage having a single-phase $TiO_2$ crystal phase.

2. Description of the Related Art

The development of hydrogen storage technology is a challenge that must be solved for the use of hydrogen energy, and is also a promising next-generation technique that may convey a technological advantage in the future use of hydrogen energy.

Currently useful hydrogen storage materials are mainly metal-based materials, and metal-based hydrides are capable of storing large amounts of hydrogen through chemical bonding of hydrogen and metal, but less than 100% of the stored hydrogen is used, and use for long periods is difficult because of permanent bonding of a portion thereof.

With the goal of solving this problem, many attempts have been made to apply an oxide-based material in lieu of a conventional metal-based hydrogen storage material.

For example, Korean Patent Application Publication No. 10-2014-0141943 discloses a hydrogen storage complex material in which a perovskite-type oxide is added to magnesium hydride, but the hydrogen storage complex material has limitations of the magnesium alloy itself and is prepared in the form of a multi-phase oxide, rather than a single-phase oxide, and thus satisfactory hydrogen storage performance is not obtained. Hence, the oxide has to be indispensably synthesized in the form of a single phase when applied to hydrogen storage.

CITATION LIST

Patent Literature (Patent Document 0001) Korean Patent Application Publication No. 10-2014-0141943

SUMMARY OF THE INVENTION

Accordingly, the present invention has been made keeping in mind the above problems with conventional metal-based hydrogen storage materials, such as low activity and poor hydrogen storage/release properties, encountered in the related art, and an aspect of the present invention is to provide a method of preparing an oxide for hydrogen storage using vanadium oxide.

Another aspect of the present invention is to provide a method of preparing an oxide for hydrogen storage having a single-phase $TiO_2$ crystal phase, in which a synthesis process is performed at about 700° C., rather than an existing solid-phase synthesis process requiring a high synthesis temperature of about 1300° C. or more, in order to synthesize a single-phase oxide for hydrogen storage through substitution of V of $VO_2$ with Ti.

However, other unspecified aspects of the present invention will be further considered within the range that may be easily deduced from the following detailed description and the effects thereof.

In order to accomplish the above aspects, an embodiment of the present invention provides a method of preparing an oxide for hydrogen storage, comprising: a) mixing and calcining vanadium oxide and titanium oxide; b) impregnating the oxide obtained in step a) with a noble metal precursor aqueous solution; and c) subjecting the oxide obtained in step b) to heat treatment in a reducing atmosphere, wherein the oxide obtained in step a) has the composition of Chemical Formula 1 below and the oxide for hydrogen storage is composed of a single-phase $TiO_2$ crystal phase:

$$V_{1-x}Ti_xO_2 \quad \text{[Chemical Formula 1]}$$

(in Chemical Formula 1, 0.05≤x≤0.95).

In the method of preparing an oxide for hydrogen storage according to an embodiment of the present invention, the vanadium oxide may be at least one selected from among VO, $VO_2$, $V_2O_3$ and $V_2O_5$.

In the method of preparing an oxide for hydrogen storage according to an embodiment of the present invention, the calcining in step a) may be performed at a temperature ranging from 400 to 1300° C.

In the method of preparing an oxide for hydrogen storage according to an embodiment of the present invention, the noble metal precursor aqueous solution in step b) may include a water-soluble salt of at least one selected from among platinum, palladium and rhodium.

In the method of preparing an oxide for hydrogen storage according to an embodiment of the present invention, the heat treatment in step c) may be performed at a temperature ranging from 400 to 700° C.

In the method of preparing an oxide for hydrogen storage according to an embodiment of the present invention, the oxide for hydrogen storage may be loaded with 0.1 to 2 wt % of a noble metal.

In the method of preparing an oxide for hydrogen storage according to an embodiment of the present invention, the $TiO_2$ crystal phase may be a rutile crystal structure.

In the method of preparing an oxide for hydrogen storage according to an embodiment of the present invention, step a) may include: mixing vanadium oxide and titanium oxide and performing primary calcination in air; and cooling the primarily calcined oxide and then performing secondary calcination in air or in a reducing atmosphere.

In the method of preparing an oxide for hydrogen storage according to an embodiment of the present invention, the primary calcination may be performed at 400 to 700° C.

In the method of preparing an oxide for hydrogen storage according to an embodiment of the present invention, the secondary calcination may be performed at 400 to 700° C.

In addition, the present invention provides an oxide for hydrogen storage, composed of a single-phase TiO$_2$ crystal phase and represented by Chemical Formula 1 below:

$$V_{1-x}Ti_xO_2 \qquad \text{[Chemical Formula 1]}$$

(in Chemical Formula 1, 0.05≤x≤0.95).

According to the present invention, it is possible to provide information on the single-phase synthesis of a $V_{1-x}Ti_xO_2$ oxide system that is applicable as a hydrogen storage oxide.

Also, the present invention can provide a method of preparing a single-phase oxide for hydrogen storage, in which a synthesis process is performed at about 700° C., rather than an existing solid-phase synthesis process requiring a high synthesis temperature of 1300° C. or more, in order to obtain a single phase, and the window width for single-phase synthesis can be increased.

Also, the present invention can be applied to a material for an electrode including an anode for a solid oxide fuel cell and can be utilized as a technique capable of further increasing the function of an anode for a solid oxide fuel cell.

The aforementioned effects are set forth to illustrate, but are not to be construed as limiting the scope of the present invention.

DESCRIPTION OF SPECIFIC EMBODIMENTS

Figure 1:
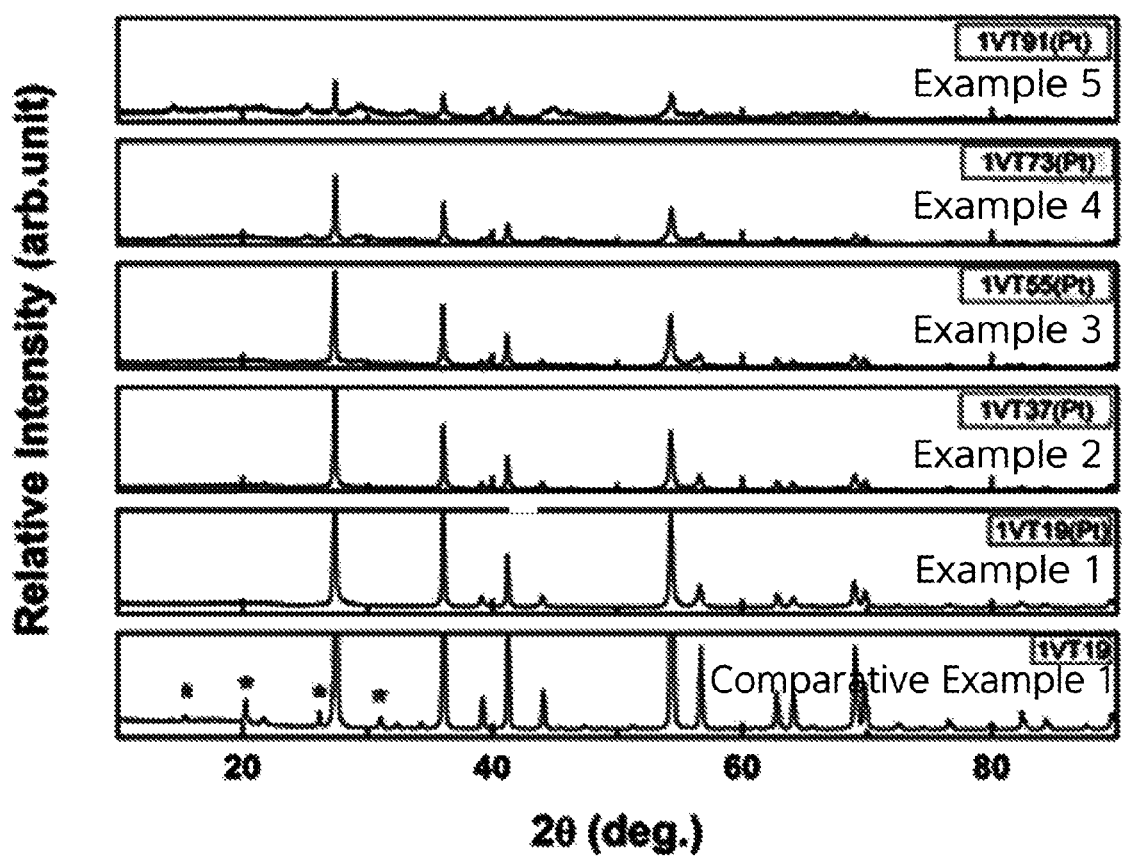
FIG. 1 is an XRD graph of oxides for hydrogen storage of Examples 1 to 5 and Comparative Example 1.

Hereinafter, a detailed description will be given of the present invention. The following embodiments and the accompanying drawings are provided by way of example so as to sufficiently convey the spirit of the present invention to those skilled in the art. Unless otherwise defined, the meanings of all terms including technical and scientific terms used herein are the same as those commonly understood by one of ordinary skill in the art to which the present invention belongs. In the following description of the present invention, detailed descriptions of known functions and components incorporated herein will be omitted when the same may make the subject matter of the present invention unclear. As used herein, the singular forms are intended to include the plural forms as well, unless the context clearly indicates otherwise. It will be further understood that the terms "comprise", "have", "be composed of", or "include", when used in this specification, specify the presence of stated elements and/or steps, but do not preclude the presence or addition of one or more other elements and/or steps.

In order to solve problems with conventional metal-based hydrogen storage materials, such as low activity and poor hydrogen storage/release properties, according to the present invention, vanadium (V) oxide and titanium (Ti) oxide are used, thus preparing an oxide for hydrogen storage having a single-phase TiO$_2$ crystal phase.

Particularly in the present invention, an impregnation process such as incipient wetness impregnation is used, rather than an existing solid-phase synthesis process in which a single-phase oxide for hydrogen storage may be prepared at a high temperature of 1300° C. or more, whereby an oxide for hydrogen storage having a single-phase TiO$_2$ crystal phase may be prepared even through heat treatment at about 600° C.

An embodiment of the present invention pertains to a method of preparing an oxide for hydrogen storage, comprising a) calcining vanadium oxide and titanium oxide, b) impregnating the oxide obtained in step a) with a noble metal precursor aqueous solution, and c) subjecting the oxide obtained in step b) to heat treatment in a reducing atmosphere, in which the oxide obtained in step a) has the composition of Chemical Formula 1 below and the oxide for hydrogen storage is composed of a single-phase TiO$_2$ crystal phase and a noble metal.

$$V_{1-x}Ti_xO_2 \qquad \text{[Chemical Formula 1]}$$

(in Chemical Formula 1, 0.05≤x≤0.95)

Specifically, a ball-milling process typically used in the art is performed in the present invention, and a vanadium oxide powder and a titanium oxide powder are mixed, the mixed oxide is calcined, and the calcined oxide is impregnated with a catalyst precursor solution, thereby preparing an oxide for hydrogen storage having a single-phase TiO$_2$ crystal phase in which the titanium site is substituted with a vanadium element.

Also, the oxide for hydrogen storage according to the present invention is prepared in the form of a single phase, thus further improving the reproducibility of hydrogen storage/release performance and lowering activation energy, whereby hydrogen may be selectively sufficiently introduced into crystal lattices. In the case where the oxide for hydrogen storage is prepared in a multi-phase form, it is impossible to predict the reproducibility of hydrogen storage/release performance.

Specifically, step a) is mixing and calcining oxide materials including vanadium oxide and titanium oxide. For example, the calcination temperature is preferably set to a temperature lower than the melting point of vanadium oxide, but the present invention is not necessarily limited thereto.

If the calcination temperature is equal to or higher than the melting point of vanadium oxide, the vanadium oxide begins to melt, thus causing material loss. Typically, in step a), the oxide materials are placed in a crucible and calcined. Here, in the case where the calcination temperature exceeds the melting point of vanadium oxide, the crucible may be contaminated by the melted vanadium oxide.

More specifically, in an embodiment of the present invention, the calcination temperature in step a) may be 400 to 1300° C. When the calcination temperature falls in the above range, vanadium oxide (or titanium oxide) may be prepared into an oxide or a complex oxide having a crystal structure different from the crystal structure before calcination, and moreover, the preparation of a single-phase oxide becomes possible.

In an embodiment of the present invention, vanadium oxide may be used as a material for preparing a VO$_2$ oxide. For example, the VO$_2$ reacts with hydrogen in a gas atmosphere containing hydrogen, and thus the hydrogen may be maximally added to VO$_2$ to give a HVO$_2$ crystal phase. Accordingly, the oxide containing VO$_2$ as represented by Chemical Formula 1 may be used as a novel hydrogen storage material.

Also, in an embodiment of the present invention, the vanadium oxide may be at least one selected from among VO, VO$_2$, V$_2$O$_3$ and V$_2$O$_5$. For example, VO has a melting point of about 1789° C., VO$_2$ has a melting point of about 1967° C., V$_2$O$_3$ has a melting point of about 1940° C., and V$_2$O$_5$ has a melting point of about 690° C. In step a), the calcination temperature is preferably set depending on the type of vanadium oxide, but in order to prepare the single-phase oxide represented by Chemical Formula 1, the calcination is not necessarily performed at a temperature equal to or less than the melting point of vanadium oxide.

According to an embodiment of the present invention, the titanium oxide may include $TiO_2$. For example, the titanium oxide may be $TiO_2$ having an anatase crystal structure. The anatase $TiO_2$ is stable at a temperature of about 400° C. or less but exhibits unstable properties in which phase conversion from anatase into rutile occurs at a temperature of about 500° C. or more. Hence, it may favorably serve as an additional diffusion power source for single-phase synthesis using phase conversion properties, and is thus preferable in the preparation of an oxide for hydrogen storage having a single-phase $TiO_2$ crystal phase according to the present invention. For example, in step a), the anatase $TiO_2$ crystal structure may change into rutile $TiO_2$.

Specifically, in step b), the oxide calcined in step a) is impregnated with a solution including a noble metal catalyst material, for example, a noble metal precursor aqueous solution, and is then dried, thereby preparing an oxide in which the surface and the pores of the oxide calcined in step a) are loaded with the noble metal precursor. The impregnation temperature is not necessarily limited, but is preferably set to room temperature. As used herein, the term "room temperature" refers to an ambient temperature in which neither heating nor cooling is performed, for example, about to 30° C., about 15 to 30° C., about 20 to 30° C., about 25° C. or about 23° C. Also, the drying temperature is not particularly limited, so long as the aqueous solution is capable of evaporating. For example, drying may be performed in an electric oven at a temperature of 100° C. or less.

According to an embodiment of the present invention, the noble metal precursor aqueous solution may include a water-soluble salt of at least one selected from among platinum, palladium and rhodium. The noble metal precursor aqueous solution preferably includes a platinum water-soluble salt. Specifically, the platinum water-soluble salt may be selected from among $(NH_3)_2Pt(NO_2)_2$, $H_2PtCl_6$ hydrate, $PtCl_2$, $PtBr_2$, $K_2PtCl_6$, $K_2PtCl_4$, $K_2[Pt(CN)_4]3H_2O$, $K_2Pt(NO_2)_4$, $Na_2PtCl_6$, $Na_2[Pt(OH)_6]$, platinum acetylacetonate, ammonium tetrachloroplatinate and mixtures thereof. Preferably $(NH_3)_2Pt(NO_2)_2$, namely tetraamminepatinum (II) nitrate, is used.

In the method of preparing the oxide for hydrogen storage according to an embodiment of the present invention, in step b), the noble metal precursor aqueous solution may be used in an amount of 5 to 60 parts by weight based on 100 parts by weight of the oxide obtained in step a) so that the oxide of Chemical Formula 1 is loaded with 0.1 to 2 wt % of the noble metal. Here, the solid content of the noble metal precursor aqueous solution may be about 1 to 10%, but the present invention is not necessarily limited thereto.

Thereafter, the oxide impregnated with the noble metal precursor aqueous solution may be dried.

In order to adjust the amount of the noble metal that is impregnated, the impregnation process in step b) and the drying process typically useful in the art may be repeatedly performed, but the present invention is not necessarily limited thereto.

The single-phase oxide for hydrogen storage obtained in step c) may be configured to be loaded with the above noble metal. Specifically, the noble metal may be contained in an amount of 0.1 to 2 wt % based on the total weight of the single-phase oxide for hydrogen storage obtained in step c).

If the amount of the noble metal is less than 0.1 wt %, the oxide obtained in step c) is difficult to prepare so as to have a single-phase $TiO_2$ crystal phase. On the other hand, if the amount of the noble metal exceeds 2 wt %, the oxide is not uniformly loaded with the noble metal, and particles composed exclusively of the noble metal oxide may be formed. Also, if the amount of the noble metal exceeds 2 wt %, a crystal phase composed of noble metal oxide may be formed, making it difficult to achieve the effects of the present invention.

Specifically, step c) is subjecting the oxide impregnated in step b) to heat treatment at a temperature of 400 to 700° C. in a reducing atmosphere, for example, a reducing atmosphere containing hydrogen gas, thus preparing an oxide represented by Chemical Formula 1 and configured to have a single-phase rutile crystal structure. For example, if the heat treatment temperature in step c) is lower than 400° C., it is difficult to prepare a single-phase oxide for hydrogen storage even in the presence of a loaded noble metal. On the other hand, if the heat treatment temperature exceeds 700° C., noble metal particles may agglomerate, and thus noble-metal-loading effects may decrease, making it difficult to prepare a single-phase oxide for hydrogen storage.

In the method of preparing the single-phase oxide for hydrogen storage according to the present invention, the oxide material in step a) may include $V_2O_5$.

Also, step a) may include primarily calcining the oxide material in air and cooling the primarily calcined oxide and then performing secondary calcination in air or in a reducing atmosphere. Thus, the present invention includes primary calcination, secondary calcination, and step b), thereby preparing a single-phase oxide for hydrogen storage even through heat treatment at about 600° C. Although an existing solid-phase synthesis process makes it possible to prepare a single-phase oxide for hydrogen storage through heat treatment at a temperature of 1300° C. or more, the heat treatment may be performed at about 700° C. or less in the present invention. When step b) is performed directly after only primary calcination in the present invention, x of Chemical Formula 1 falls in the range of $0.05 \leq x \leq 0.55$, thus achieving the effects of the present invention.

More specifically, step a) may include mixing vanadium oxide and titanium oxide, primarily calcining the mixed oxide in air, pulverizing the primarily calcined oxide, and secondarily calcining the pulverized oxide in air or in a reducing atmosphere.

According to an embodiment of the present invention, the primary calcination may be performed at 400 to 700° C. in order to achieve the effects of the present invention. For example, if the primary calcination temperature is lower than 400° C., the calcination is difficult to perform due to the low temperature. On the other hand, if the primary calcination temperature is higher than 700° C., $V_2O_5$ may be melted, and thus the material may be lost, or the crucible may be contaminated.

Also, the secondary calcination may be performed at 400 to 700° C. in order to achieve the effects of the present invention. For example, if the secondary calcination temperature is lower than 400° C., the calcination is difficult to perform due to the low temperature. On the other hand, if the secondary calcination temperature is higher than 700° C., $V_2O_5$ may be melted, and thus loss of the material may occur or the crucible may be contaminated.

In addition, the present invention pertains to a single-phase oxide for hydrogen storage, prepared by the aforementioned method.

According to an embodiment of the present invention, the single-phase oxide for hydrogen storage may be composed of a single-phase $TiO_2$ crystal phase and is represented by Chemical Formula 1 below.

$$V_{1-x}Ti_xO_2 \quad \text{[Chemical Formula 1]}$$

(in Chemical Formula 1, 0.05≤x≤0.95)

A better understanding of the present invention will be given through the following examples, which are set forth to illustrate but are not to be construed as limiting the present invention.

Before the description of the following examples, the chemical composition of a $V_{1-x}Ti_xO_2$ oxide system is summarized in Table 1 below.

TABLE 1

|  | $V_{1-x}Ti_xO_2$ Composition | Acronym |
|---|---|---|
| Example 1 | $V_{0.9}Ti_{0.1}O_2$ | VT91 |
| Example 2 | $V_{0.7}Ti_{0.3}O_2$ | VT73 |
| Example 3 | $V_{0.5}Ti_{0.5}O_2$ | VT55 |
| Example 4 | $V_{0.3}Ti_{0.7}O_2$ | VT37 |
| Example 5 | $V_{0.1}Ti_{0.9}O_2$ | VT19 |

Example 1

In order to satisfy the chemical composition of Table 1, 18.22 g of a $V_2O_5$ powder and 1.78 g of a $TiO_2$ powder were weighed and mixed through wet ball milling. Next, the mixed powder was dried and was then primarily calcined at 500° C. for 5 hr in air. After the primary calcination, the oxide powder was pulverized through ball milling, dried, and secondarily calcined at 600° C. for 5 hr in air, thus preparing an oxide having a composition of $V_{0.9}Ti_{0.1}O_2$.

Next, the calcined oxide powder was pulverized, and 0.25 g of the pulverized oxide powder was added to an aqueous solution of tetraammineplatinum (II) nitrate dissolved at a concentration of 3 to 4%, followed by incipient wetness impregnation.

After completion of the impregnation, the oxide powder was subjected to heat treatment at 600° C. for 1 hr in a reducing atmosphere containing 4% hydrogen gas, thereby preparing an oxide for hydrogen storage composed of a single-phase $TiO_2$ crystal phase.

Example 2

The same procedures as in Example 1 were performed, with the exception that 14.53 g of $V_2O_5$ and 5.47 g of $TiO_2$ were used and an oxide having a composition of $V_{0.7}Ti_{0.3}O_2$ was prepared.

Example 3

The same procedures as in Example 1 were performed, with the exception that 10.65 g of $V_2O_5$ and 9.35 g of $TiO_2$ were used and an oxide having a composition of $V_{0.5}Ti_{0.5}O_2$ was prepared.

Example 4

The same procedures as in Example 1 were performed, with the exception that 6.56 g of $V_2O_5$ and 13.44 g of $TiO_2$ were used and an oxide having a composition of $V_{0.3}Ti_{0.7}O_2$ was prepared.

Example 5

The same procedures as in Example 1 were performed, with the exception that 2.25 g of $V_2O_5$ and 17.75 g of $TiO_2$ were used and an oxide having a composition of $V_{0.1}Ti_{0.9}O_2$ was prepared.

Comparative Example 1

The same procedures as in Example 1 were performed, with the exception that incipient wetness impregnation was not performed.

The crystal structures of the oxides for hydrogen storage of Examples 1 to 5 and Comparative Example 1 were analyzed using XRD.

FIG. 1 is an XRD graph of the oxides for hydrogen storage of Examples 1 to 5 and Comparative Example 1. As shown in FIG. 1, the oxides prepared in Examples 1 to 5 according to the present invention were confirmed to be single-phase oxides. Here, the single-phase oxide had a rutile $TiO_2$ crystal structure.

However, in the oxide for hydrogen storage of Comparative Example 1, the $V_2O_5$ crystal peaks were observed, and are represented by *, from which the single-phase oxide was confirmed not to have been prepared.

The electrical conductivity of a hydrogen storage material prepared using the oxide for hydrogen storage of Example 1 was measured. Specifically, the oxide powder for hydrogen storage of Example 1 was placed in a mold and shaped, followed by heat treatment at 1100° C. in air, whereby a test sample for measurement of electrical conductivity was manufactured. The electrical conductivity of the test sample thus manufactured was measured through a DC4 probe process. The measurement temperature was set to the range of room temperature to 900° C. both in air and in a reducing ($H_2$) atmosphere.

Figure 2:
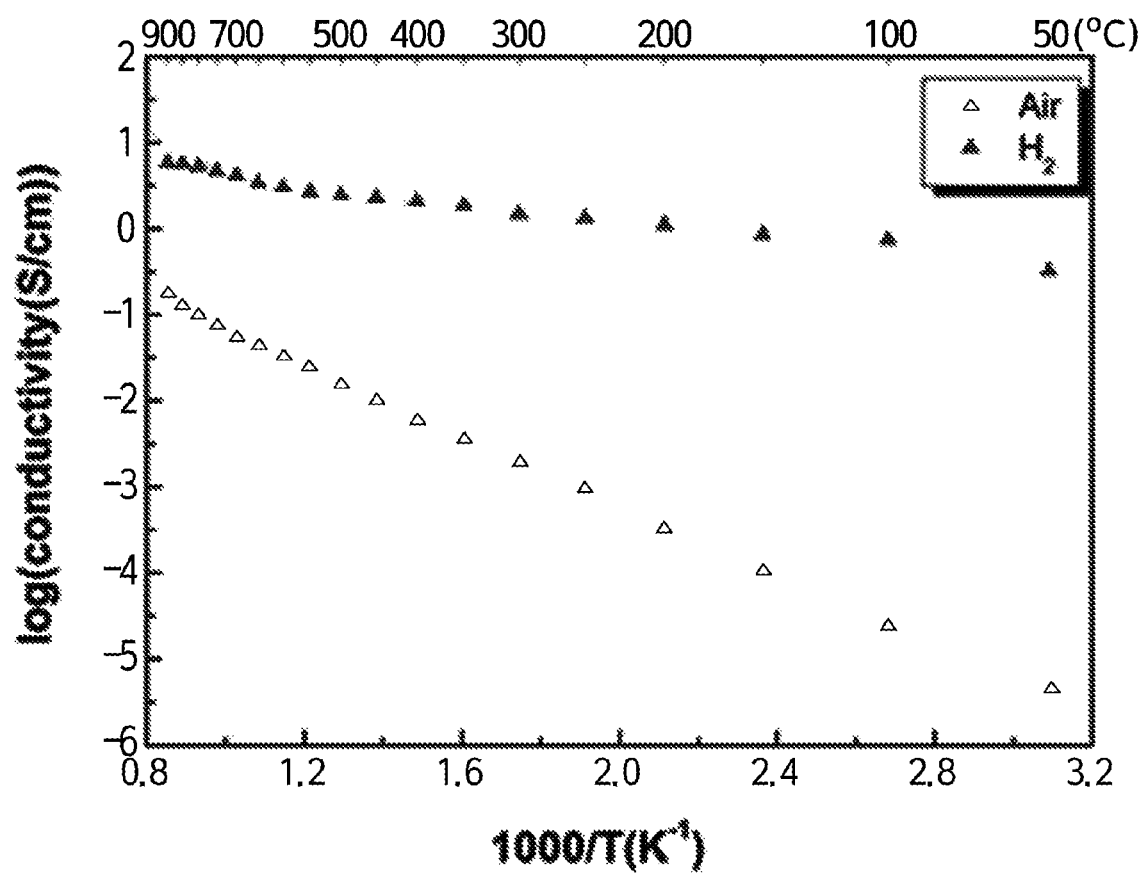
FIG. 2 is a graph showing electrical conductivity of the oxide for hydrogen storage of Example 1.

FIG. 2 is a graph showing the electrical conductivity of the oxide for hydrogen storage of Example 1. As shown in FIG. 2, electrical conductivity was as high as about $10^5$ times at a low temperature of 100° C. or less and as high as about $10^2$ times at a high temperature of 700° C. or more in a reducing atmosphere, rather than in air. Also, the single-phase oxide for hydrogen storage of Example 1 can be found to exhibit semiconductor behavior in which electrical conductivity increases with an increase in the temperature. For example, the electrical conductivity of the oxide for hydrogen storage of Example 1 was measured to be about 3.025 S/cm at 600° C. in a hydrogen atmosphere.

The activation energy was calculated using the results of electrical conductivity of FIG. 2 and the Arrhenius equation. The single-phase oxide for hydrogen storage of Example 1 exhibited activation energy of about 0.404 eV in air and of about 0.102 eV in a hydrogen atmosphere.

Example 6

In order to satisfy the chemical composition of Table 1, 18.22 g of a $V_2O_5$ powder and 1.78 g of a $TiO_2$ powder were weighed and mixed through wet ball milling. Next, the mixed powder was dried and was then primarily calcined at 900° C. for 5 hr in air, thus preparing an oxide having a composition of $V_{0.9}Ti_{0.1}O_2$.

Next, the calcined oxide powder was pulverized, and 0.25 g of the pulverized oxide powder was added to an aqueous solution of tetraammineplatinum (II) nitrate dissolved at a concentration of 3.5%, followed by incipient wetness impregnation.

After completion of the impregnation, the oxide powder was subjected to heat treatment at 600° C. for 1 hr in a reducing atmosphere containing 4% hydrogen gas, thereby preparing a single-phase oxide.

Example 7

The same procedures as in Example 6 were performed, with the exception that 14.53 g of $V_2O_5$ and 5.47 g of $TiO_2$ were used and an oxide having a composition of $V_{0.7}Ti_{0.3}O_2$ was prepared.

Example 8

The same procedures as in Example 6 were performed, with the exception that 10.65 g of $V_2O_5$ and 9.35 g of $TiO_2$ were used and an oxide having a composition of $V_{0.5}Ti_{0.5}O_2$ was prepared.

Example 9

In order to satisfy the chemical composition of Table 1, a $V_2O_3$ powder and a $TiO_2$ powder were weighed and mixed through wet ball milling. Next, the mixed powder was dried and was then calcined at 1000° C. for 5 hr in air, thus preparing an oxide having a composition of $V_{0.5}Ti_{0.5}O_2$.

Next, the calcined oxide powder was pulverized, and 0.25 g of the pulverized oxide powder was added to an aqueous solution of tetraammineplatinum (II) nitrate dissolved at a concentration of 3.5%, followed by incipient wetness impregnation.

After completion of the impregnation, the oxide powder was subjected to heat treatment at 600° C. for 1 hr in a reducing atmosphere containing 4% hydrogen gas, thereby preparing a single-phase oxide.

Comparative Example 2

The same procedures as in Example 6 were performed, with the exception that 6.56 g of $V_2O_5$ and 13.44 g of $TiO_2$ were used and an oxide having a composition of $V_{0.3}Ti_{0.7}O_2$ was prepared.

The crystal structures of the single-phase oxides for hydrogen storage of Examples 6 to 9 and Comparative Example 2 were analyzed using XRD.

Figure 3:
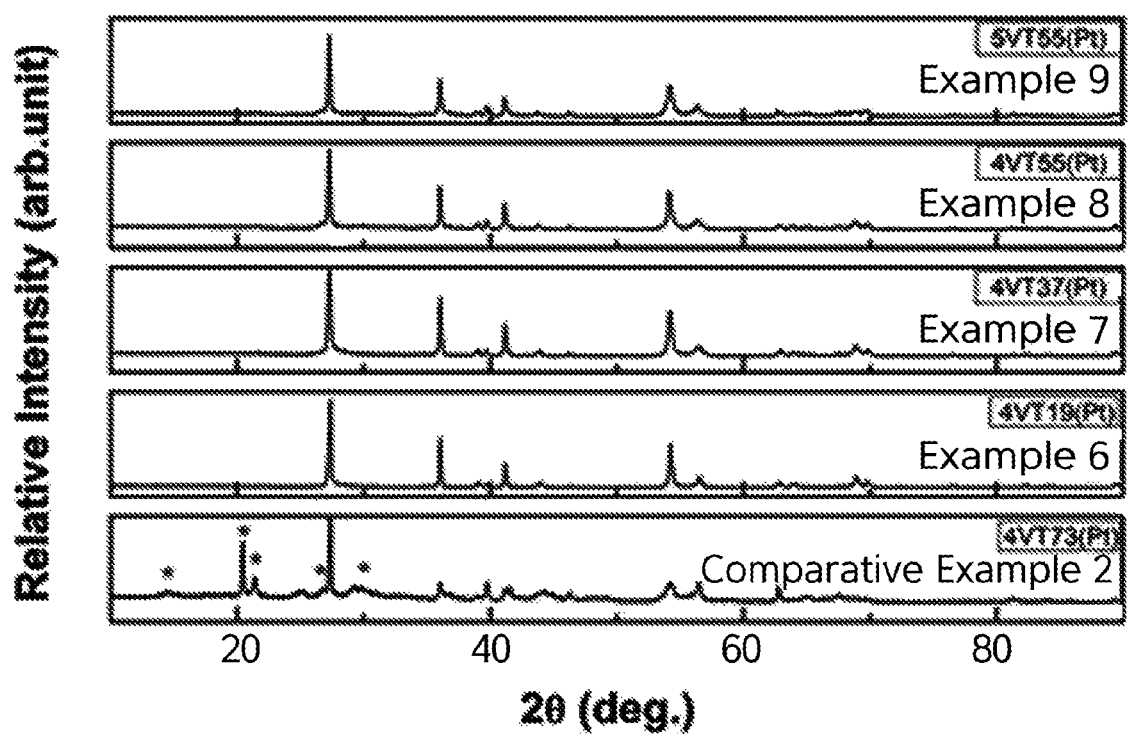
FIG. 3 is an XRD graph of oxides for hydrogen storage of Examples 6 to 9 and Comparative Example 2.

FIG. 3 is an XRD graph of the oxides for hydrogen storage of Examples 6 to 9 and Comparative Example 2. As shown in FIG. 3, the oxides prepared in Examples 6 to 9 according to the present invention were confirmed to be single-phase oxides. Here, the single-phase oxide had a rutile $TiO_2$ crystal structure.

However, in the oxide for hydrogen storage of Comparative Example 2, the $V_2O_5$ crystal peaks were observed, and are represented by *, from which the single-phase oxide was confirmed not to have been prepared.

As mentioned hereinbefore, although the preferred embodiments of the present invention have been disclosed herein and in the drawings, those skilled in the art will appreciate that various modifications, additions and substitutions are possible, without departing from the scope and spirit of the invention as disclosed in the accompanying claims.

Accordingly, the spirit of the present invention should not be construed as being limited to the embodiments described, and all of the appended claims and the equivalents thereto fall within the scope of the present invention.

What is claimed is:

1. A method of preparing an oxide for hydrogen storage, comprising:
   (a) mixing and calcining vanadium oxide and titanium oxide to provide an oxide;
   (b) impregnating the oxide obtained in step (a) with a noble metal precursor aqueous solution; and
   (c) subjecting the oxide obtained in step (b) to heat treatment in a reducing atmosphere,
   wherein the oxide obtained in step (a) has a composition of Chemical Formula (1) below and is composed of a single-phase $TiO_2$ crystal phase:

$$V_{1-x}Ti_xO_2, \quad \text{Chemical Formula (1)}$$

where $0.05 \leq x \leq 0.95$.

2. The method of claim 1, wherein the vanadium oxide is at least one oxide selected from the group consisting of VO, $VO_2$, $V_2O_3$ and $V_2O_5$.

3. The method of claim 1, wherein the calcining in step (a) is performed at a temperature ranging from 400 to 1300° C.

4. The method of claim 1, wherein the noble metal precursor aqueous solution in step (b) includes a water-soluble salt of at least one salt selected from the group consisting of platinum, palladium and rhodium.

5. The method of claim 1, wherein the heat treatment in step (c) is performed at a temperature ranging from 400 to 700° C.

6. The method of claim 1, wherein the oxide for hydrogen storage is loaded with 0.1 to 2 wt % of a noble metal, after step (c).

7. The method of claim 1, wherein the $TiO_2$ crystal phase has a rutile crystal structure.

8. The method of claim 1, wherein step (a) comprises:
   mixing vanadium oxide and titanium oxide and performing primary calcination in air; and
   cooling the primarily calcined oxide and then performing secondary calcination in air or in a reducing atmosphere.

9. The method of claim 8, wherein the primary calcination is performed at 400 to 700° C.

10. The method of claim 8, wherein the secondary calcination is performed at 400 to 700° C.

* * * * *